US008949715B1

(12) United States Patent
Tajima

(10) Patent No.: US 8,949,715 B1
(45) Date of Patent: Feb. 3, 2015

(54) IMAGE PROCESSING APPARATUS, METHOD AND NON-TRANSITORY COMPUTER READABLE MEDIUM CAPABLE OF CALCULATING TIME FOR DISPLAYING AND PRINTING THUMBNAIL IMAGES

(71) Applicant: Fuji Xerox Co., Ltd., Minato-ku, Tokyo (JP)

(72) Inventor: Shingo Tajima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/277,971

(22) Filed: May 15, 2014

(30) Foreign Application Priority Data

Oct. 10, 2013 (JP) ................................ 2013-212529

(51) Int. Cl.
*G06F 3/12* (2006.01)
*G06K 15/00* (2006.01)
*G06K 15/02* (2006.01)

(52) U.S. Cl.
CPC .............. *G06F 3/1208* (2013.01); *G06F 3/121* (2013.01); *G06F 3/1234* (2013.01)
USPC ........... 715/274; 358/1.2; 358/1.15; 358/1.16

(58) Field of Classification Search
None
See application file for complete search history.

(56) References Cited

U.S. PATENT DOCUMENTS

2012/0274952 A1* 11/2012 Fukuhara ........................ 358/1.2

FOREIGN PATENT DOCUMENTS

| JP | 2008-129642 A | 6/2008 |
| JP | 2009-149108 A | 7/2009 |
| JP | 2010-283764 A | 12/2010 |

OTHER PUBLICATIONS

Machine translation of JP Pub 2006-252191 to Yabuuchi Masayuki.*

* cited by examiner

*Primary Examiner* — Eric A Rust
*Assistant Examiner* — Haris Sabah
(74) *Attorney, Agent, or Firm* — Sughrue Mion, PLLC

(57) ABSTRACT

An image processing apparatus includes a print controller, a calculation unit, a generation unit, and a display controller. The print controller makes print images for plural pages be printed. The calculation unit calculates, if a time required for display is longer than a time required for printing, a page interval at which display of a reduced image in synchronization with completion of printing of a print image is possible. The generation unit generates reduced images of print images for pages among the plural pages at the calculated page interval. The display controller makes a reduced image of a print image be displayed in synchronization with completion of printing of the print image. If a reduced image of a print image to be displayed in synchronization with completion of printing of the print image has not been generated, the display controller makes a reduced image generated last be displayed.

5 Claims, 5 Drawing Sheets

FIG. 6

IMAGE PROCESSING APPARATUS, METHOD AND NON-TRANSITORY COMPUTER READABLE MEDIUM CAPABLE OF CALCULATING TIME FOR DISPLAYING AND PRINTING THUMBNAIL IMAGES

CROSS-REFERENCE TO RELATED APPLICATIONS

This application is based on and claims priority under 35 USC 119 from Japanese Patent Application No. 2013-212529 filed Oct. 10, 2013.

BACKGROUND

Technical Field

The present invention relates to an image processing apparatus, an image processing method, and a non-transitory computer readable medium.

SUMMARY

According to an aspect of the invention, there is provided an image processing apparatus including a print controller, a calculation unit, a generation unit, and a display controller. The print controller performs print control so as to make a print unit perform printing of print images for plural pages generated from print data. The calculation unit calculates, in a case where a time required for display is longer than a time required for printing, the time required for printing being a time required for a print image for one page generated from the print data to be printed by the print unit, the time required for display being a time required for a reduced image of the print image for the one page to be generated and displayed, a page interval at which display of a reduced image in synchronization with completion of printing of a print image is possible. The generation unit generates reduced images of print images for pages among the plural pages at the page interval calculated by the calculation unit. The display controller performs display control so as to make a display perform display of a reduced image of a print image in synchronization with completion of printing of the print image. In a case where a reduced image of a print image to be displayed in synchronization with completion of printing of the print image has not been generated by the generation unit, the display controller makes a reduced image generated last be displayed in synchronization with completion of printing of the print image.

BRIEF DESCRIPTION OF THE DRAWINGS

An exemplary embodiment of the present invention will be described in detail based on the following figures, wherein:

FIG. 6 is a diagram illustrating processing to be performed when an error occurs during printing in FIG. 4, along the time axis.

DETAILED DESCRIPTION

An exemplary embodiment of the present invention will be described below with reference to the drawings.

Figure 1:
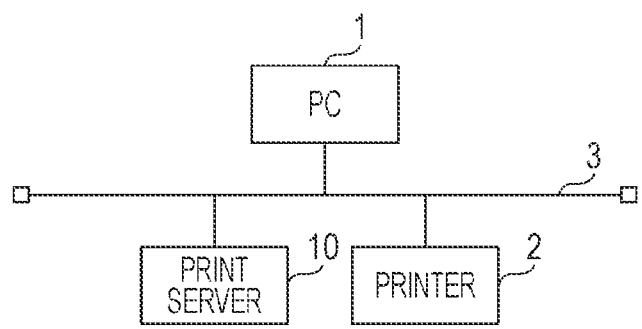
FIG. 1 is a diagram illustrating an overall configuration of an image processing system according to an exemplary embodiment of the present invention.

FIG. 1 is a diagram illustrating an overall configuration of an image processing system according to an exemplary embodiment. FIG. 1 illustrates a configuration in which a personal computer (PC) 1, a printer 2, and a print server 10 are connected to one another over a network 3. The PC 1 is used by a user who desires to perform printing. The printer 2 is provided as a print unit that performs printing by outputting a print image to a print medium. The print server 10 makes the printer 2 perform printing by generating a print image on the basis of a print job transmitted from the PC 1 and transmitting the print image to the printer 2. Note that, in FIG. 1, only one PC 1 and one printer 2 are illustrated, however, plural PCs 1 or plural printers 2 may be connected to the network 3.

Figure 2:
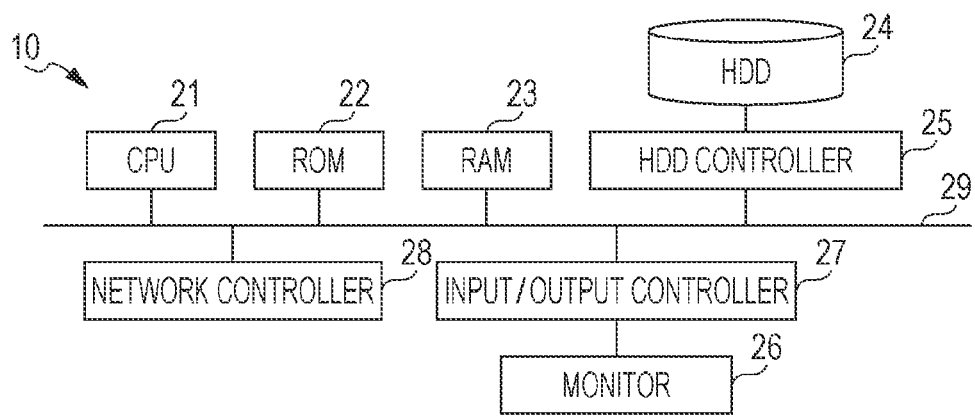
FIG. 2 is a diagram illustrating a hardware configuration of a print server, which is an exemplary embodiment of an image processing apparatus according to the exemplary embodiment of the present invention.

FIG. 2 is a diagram illustrating a hardware configuration of the print server 10, which is an exemplary embodiment of an image processing apparatus according to the exemplary embodiment of the present invention. In this exemplary embodiment, a server computer that constitutes the print server 10 may be implemented by employing a previously existing, general-purpose hardware configuration. That is, as illustrated in FIG. 2, the server computer has a configuration in which a central processing unit (CPU) 21, a read-only memory (ROM) 22, a random access memory (RAM) 23, a hard disk drive (HDD) controller 25 to which an HDD 24 is connected, an input/output controller 27 to which a monitor 26 provided as a display is connected, and a network controller 28 provided as a communication unit are connected to an internal bus 29. Note that an input unit, such as a mouse or a keyboard, may be connected to the input/output controller 27, as appropriate, or a touch panel-type user interface unit may be used as the monitor 26.

Figure 3:
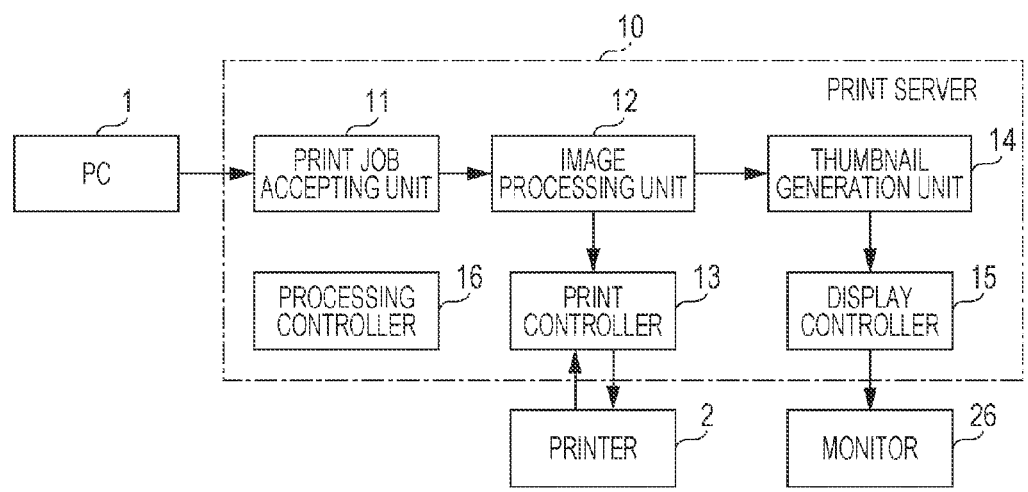
FIG. 3 is a block diagram of the print server according to the exemplary embodiment.

FIG. 3 is a block diagram of the print server 10 according to this exemplary embodiment. The print server 10 of this exemplary embodiment includes a print job accepting unit 11, an image processing unit 12, a print controller 13, a thumbnail generation unit 14, a display controller 15, and a processing controller 16. A component that is not mentioned in the description of this exemplary embodiment is not illustrated in FIG. 3.

The print job accepting unit 11 accepts a print job transmitted from the PC 1. The image processing unit 12 generates a print image in a format that is printable by the printer 2, from print data contained in a print job, such as an electronic document to be printed, by performing certain image processing. The print controller 13 is provided as a print controller, and performs print control so as to make the printer 2 perform printing by transmitting a print image generated by the image processing unit 12 to the printer 2. The print controller 13 is also provided as a detection unit and detects an error in printing. The thumbnail generation unit 14 is provided as a generation unit, and generates thumbnails of print images for plural pages as reduced images at a page interval calculated by the processing controller 16. The display controller 15 is provided as a display controller, and performs display control so as to make the monitor 26 display a thumbnail generated by the thumbnail generation unit 14 in synchronization with completion of printing performed by the printer 2. The processing controller 16 performs overall processing control in the print server 10 in cooperation with other components.

Specifically, the processing controller 16 of this exemplary embodiment functions as a calculation unit, compares a time required for printing, which is the time required for a print image for one page generated from print data to be printed by the printer 2, with a time required for display, which is the time required for a thumbnail of the print image for the one page to be generated and displayed, and if the time required for display is longer than the time required for printing, calculates a page interval at which display of a thumbnail in synchronization with completion of printing of a print image is possible.

The components 11 to 16 in the print server 10 are implemented by coordinated operations between a computer that constitutes the print server 10 and a program that runs on the CPU 21 mounted in the computer.

A program used in this exemplary embodiment may be, as a matter of course, supplied from a communication unit, or the program may be stored in a computer readable recording medium, such as a compact disc read-only memory (CD-ROM) or a digital versatile disc read-only memory (DVD-ROM), and be supplied from such a computer readable recording medium. The program supplied from a communication unit or a recording medium is installed in a computer and is sequentially executed by the CPU of the computer to thereby implement various kinds of processing.

Figure 4:
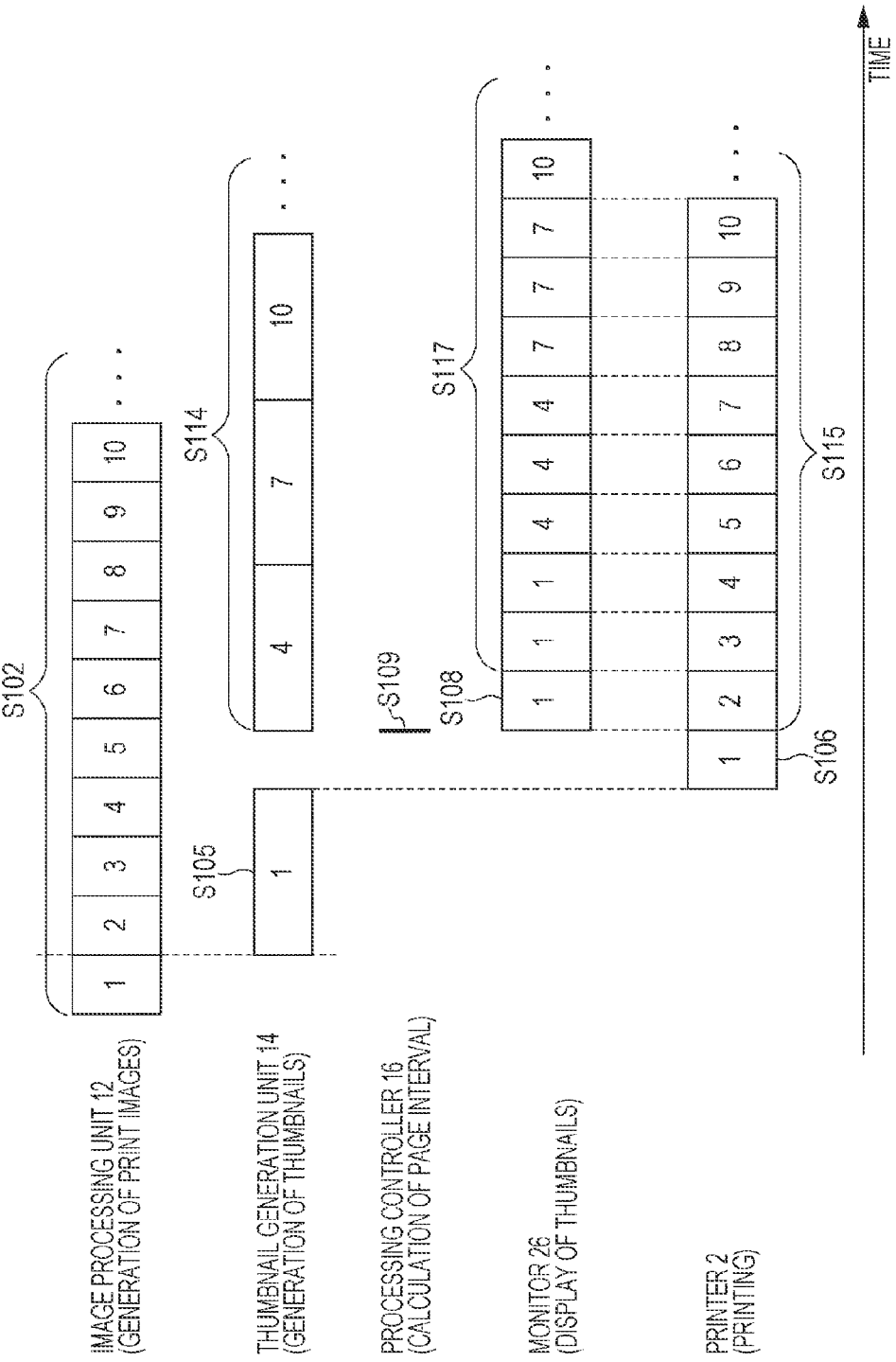
FIG. 4 is a diagram illustrating processing performed by components included in the print server of the exemplary embodiment, along a time axis.

FIG. 4 illustrates pieces of processing along a time axis, which include generation of print images performed by the image processing unit 12, generation of thumbnails performed by the thumbnail generation unit 14, calculation of a page interval performed by the processing controller 16, display of thumbnails by the monitor 26 in accordance with control performed by the display controller 15, and printing by the printer 2 in accordance with control performed by the print controller 13. Each rectangle in FIG. 4 represents the time length of a corresponding piece of processing, and a number written in each rectangle indicates a corresponding page number.

Figure 5:
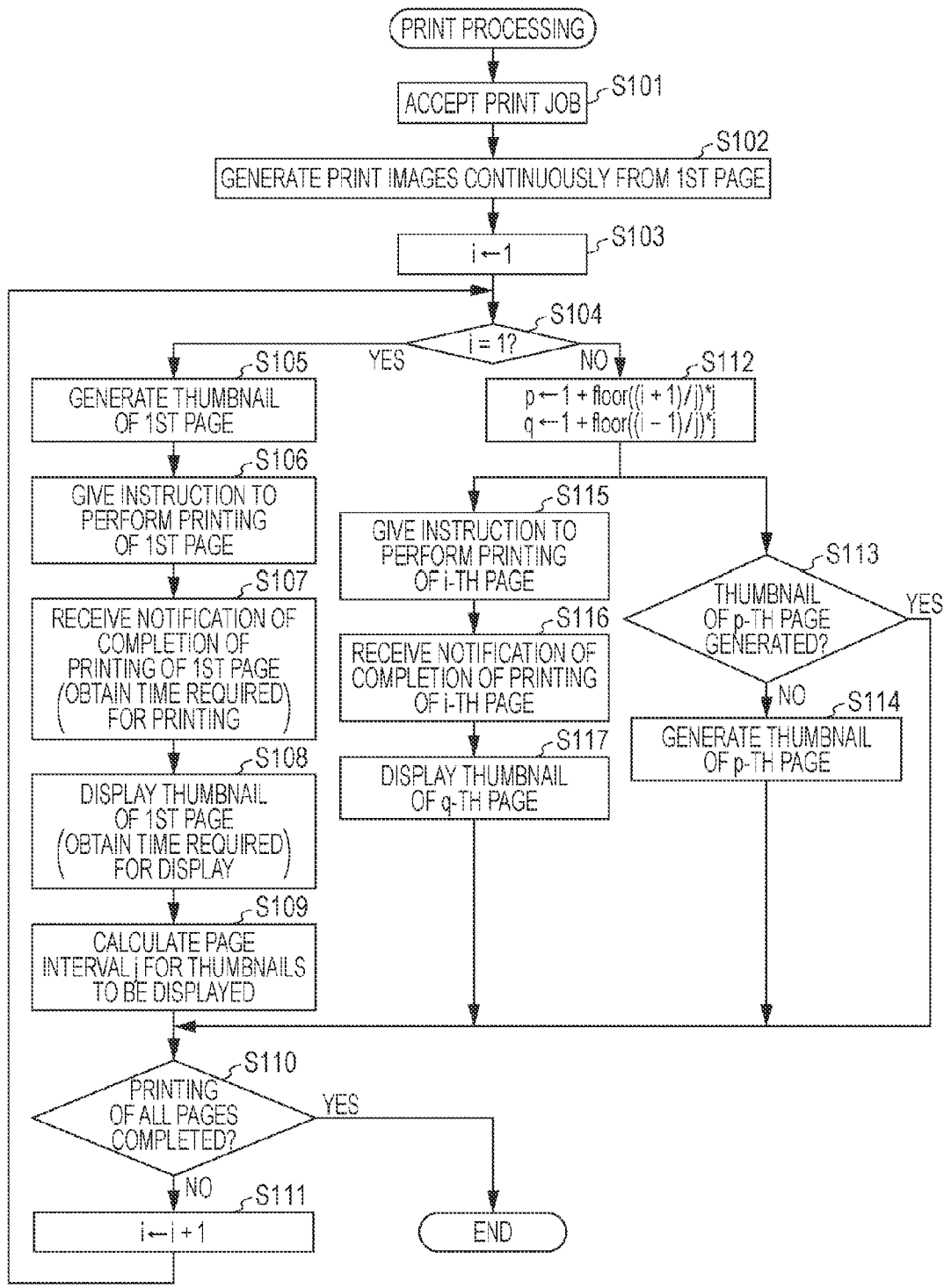
FIG. 5 is a flowchart illustrating print processing according to the exemplary embodiment.

Print processing of this exemplary embodiment will be described below with reference to FIG. 4 and a flowchart illustrated in FIG. 5. Note that, in FIGS. 4 and 5, the same processing is given the same step number.

When the print job accepting unit 11 accepts a print job transmitted from the PC 1 (step S101), the image processing unit 12 generate a print image from print data contained in the print job in accordance with an instruction given by the processing controller 16. In the case where the print data contains data for plural pages, the image processing unit 12 continuously generates print images of the pages in order from the first page (step S102). When generation of a print image for one page has been completed, the print controller 13 confirms completion of printing of the previous page and thereafter successively transmits the print image to the printer 2 so as to make the printer 2 perform printing, which is processing usually performed.

In this exemplary embodiment, however, when processing is performed on the first page (Yes in step S104), the processing controller 16 makes the thumbnail generation unit 14 generate a thumbnail of the print image of the first page before making the print controller 13 transmit the generated print image to the printer 2 so as to perform printing (step S105). Note that print processing on the first page may be performed simultaneously in parallel with thumbnail generation processing on the first page. However, in order to complete thumbnail generation with certainty for the first page before printing of the first page so as to make it possible to display the thumbnail of the first page simultaneously with completion of printing of the first page, in this exemplary embodiment, the print controller 13 is configured to wait for an instruction for performing printing of the first page.

When generation of the thumbnail has been completed, the print controller 13 makes the printer 2 perform printing by transmitting the print image of the first page in accordance with an instruction given by the processing controller 16 (step S106). When the print image has been transmitted from the print server 10, the printer 2 prints the print image on a print medium. When printing has been completed, a notification of completion is sent to the print server 10. Here, description is given while assuming that printing is successfully completed.

The processing controller 16 measures and obtains the time (time required for printing) from when a print image is generated until when the print image is printed, by receiving a notification of successful completion sent from the printer 2 (step S107). In the case where processing is performed on the first page, printing is actually performed after waiting for an amount of time required to perform thumbnail generation processing. Therefore, the time required for printing needs to be calculated by subtracting such an amount of time.

In this way, the processing controller 16 obtains the time (time required for printing) from when a print image is generated until when printing of the print image is completed, by performing processing on the print data of the first page. When completion of printing of the first page has been confirmed, the display controller 15 displays on the monitor 26 the thumbnail of the first page in accordance with an instruction given by the processing controller 16. The processing controller 16 obtains the time (time required for display) required for a thumbnail of the print image to be generated and displayed, when the thumbnail is displayed on the monitor 26 (step S108). Note that, after the thumbnail of the first page has been generated, the thumbnail will be displayed after printing of the print image has been completed. Therefore, the time required for display needs to be calculated by subtracting the amount of time taken for completion of printing.

Here, the processing controller 16 compares the time required for printing with the time required for display, and calculates a page interval at which display of a thumbnail in synchronization with completion of printing is possible (step S109). For example, it is assumed that printing of one page takes two seconds. That is, in the case where the time required for printing is two seconds, if generation and display of a thumbnail also takes two seconds (that is, the time required for display is two seconds), it is possible to display a thumbnail of a page in synchronization with completion of printing of the page even if a thumbnail is generated every page. In other words, in the case where generation and display processing on a thumbnail is completed within a time period equal to or less than the time required for printing, it may be possible to make the thumbnail generation unit 14 process a print image of every page and generate a thumbnail of the print image.

On the other hand, in the case where generation and display processing on a thumbnail takes more than two seconds, it is not possible to display a thumbnail of a page in synchronization with completion of printing of the page if a thumbnail of every page is generated. It is not appropriate to suspend printing in order for such synchronization. Accordingly, in this exemplary embodiment, in the case where the time required for display is longer than the time required for printing, thumbnails are generated at a certain page interval. In other words, in this exemplary embodiment, some thumbnails are generated while skipping others.

For example, it is assumed that printing of one page takes two seconds. In the case where generation and display processing on a thumbnail takes four seconds, it is possible to achieve synchronization if thumbnails of the first, third, and fifth pages are generated, for example, that is, a thumbnail is generated every two pages by skipping a thumbnail every other page, namely, at a two-page interval. In the case where generation and display processing on a thumbnail takes five seconds, it is possible to achieve synchronization if thumbnails of the first, fourth, and seventh pages are generated, for example, that is, a thumbnail is generated every three pages by skipping thumbnails for two pages, namely, at a three-page interval. Generally, a page interval j that is used to indicate a page for which a thumbnail is to be generated next may be calculated by using ceil (time required for display/time required for printing). ceil( ) is a round-up function used to round up the fractional portion of a number. Note that FIG. 4 illustrates an example of a case where the page interval j is 3.

For the second and subsequent pages, processing described below is performed until printing of all pages is completed (No in step S110 and step S111). Specifically, in the case where processing is performed on the second and subsequent pages (No in step S104), the processing controller 16 calculates the page number of a page for which a thumbnail is to be generated in thumbnail generation processing, that is, the processing controller 16 determines for what page number a corresponding thumbnail is to be generated. The processing controller 16 also calculates the page number of a page for which a thumbnail is to be displayed, that is, the processing controller 16 determines for what page number a corresponding thumbnail is to be displayed at the time when printing is completed (step S112). It is assumed that the former page number, which is the page number of a page for which a thumbnail is to be generated, is represented by p, and the latter page number, which is the page number of a page for which a thumbnail is to be displayed, is represented by q. Then, p is calculated by using a computational expression 1+floor((i+1)/j))×j, and q is calculated by using a computational expression 1+floor((i−1)/j))×j. floor( ) is a round-down function used to round down the fractional portion of a number.

If the page interval is 3, the processing controller 16 makes the thumbnail generation unit 14 generate thumbnails every three pages, such as the first, fourth, seventh pages, and so on. Therefore, if i is 2, p becomes 4. However, a thumbnail for the fourth page is not generated yet (No in step S113) and therefore the processing controller 16 makes the thumbnail generation unit 14 generate a thumbnail on the basis of the print image of the fourth page (step S114).

In parallel with the thumbnail generation processing, the print controller 13 makes the printer 2 perform printing by transmitting the print image of the second page in accordance with an instruction given by the processing controller 16 (step S115). When the print controller 13 receives a notification of successful completion of printing of the second page from the printer 2 (step S116), the processing controller 16 makes the display controller 15 display the thumbnail of the first page because q becomes 1 when i is 2. In this way, by displaying the thumbnail of the first page on the monitor 26, a user is notified of completion of printing of the second page (step S117).

Next, when processing is performed on the third page (No in step S110, step S111, No in step s104), the processing controller 16 first calculates p, which is the page number of a page for which a thumbnail is to be generated in thumbnail generation processing, and q, which is the page number of a page for which a thumbnail is to be displayed (step S112). When i is 3, p becomes 4. However, thumbnail generation processing on the fourth page has already been started (Yes in S113) and therefore generation of the thumbnail is not newly attempted. Note that thumbnail generation processing on the fourth page is being performed but is not completed.

On the other hand, the print controller 13 makes the printer 2 perform printing by transmitting the print image of the third page in accordance with an instruction given by the processing controller 16 (step S115). When the print controller 13 receives a notification of successful completion of printing of the third page from the printer 2 (step S116), the processing controller 16 makes the display controller 15 display the thumbnail of the first page because q becomes 1 when i is 3. In this way, by displaying the thumbnail of the first page on the monitor 26, a user is notified of completion of printing of the third page (step S117).

Next, when processing is performed on the fourth page (No in step S110, step S111, No in step s104), the processing controller 16 first calculates p, which is the page number of a page for which a thumbnail is to be generated in thumbnail generation processing, and q, which is the page number of a page for which a thumbnail is to be displayed (step S112). When i is 4, p becomes 4. However, thumbnail generation processing on the fourth page has already been started (Yes in S113) and therefore generation of the thumbnail is not newly attempted. Note that thumbnail generation processing on the fourth page is being performed and will be completed by the time when printing of the fourth page is completed.

On the other hand, the print controller 13 makes the printer 2 perform printing by transmitting the print image of the fourth page in accordance with an instruction given by the processing controller 16 (step S115). When the print controller 13 receives a notification of successful completion of printing of the fourth page from the printer 2 (step S116), the processing controller 16 makes the display controller 15 display the thumbnail of the fourth page because q becomes 4 when i is 4. In this way, by displaying the thumbnail of the fourth page on the monitor 26, a user is notified of completion of printing of the fourth page (step S117).

Processing performed on the fifth page to the last page is repetition of processing performed on the second to fourth pages described above and therefore a description thereof will be omitted.

Usually, desired processing is such that, when printing of the i-th page has been completed, by displaying a thumbnail of the i-th page, a user is notified of completion of printing of the i-th page. However, there is a case where it is not possible to synchronize display of a thumbnail of a page with completion of printing of the page because the time required for display, which is the time required for a thumbnail of a print image for one page to be generated and displayed, is longer than the time required for printing, which is the time required for the print image for the one page to be printed by the printer 2. In such a case, as described above, in this exemplary embodiment, thumbnails of pages are generated at an interval that is set so that the thumbnails are generated and displayed without delay, and a thumbnail that has been generated last is displayed for a page for which a thumbnail is unable to be generated and displayed without delay to thereby make it possible to synchronize display of a thumbnail with completion of printing of a page. That is, in this exemplary embodiment, display of a thumbnail is synchronized with completion of printing of a print image by skipping generation of some thumbnails. In fact, as illustrated in FIG. 4, completion of printing of the second and third pages is synchronized with display of the thumbnail of the first page, that is, a thumbnail of a page different from the pages for which printing has been completed. However, by displaying a thumbnail that has been generated last, a user roughly knows the progress of printing. Note that, the displayed thumbnail synchronized with the completion of printing may be kept displayed until the next thumbnail generating process is performed.

Figure 6:
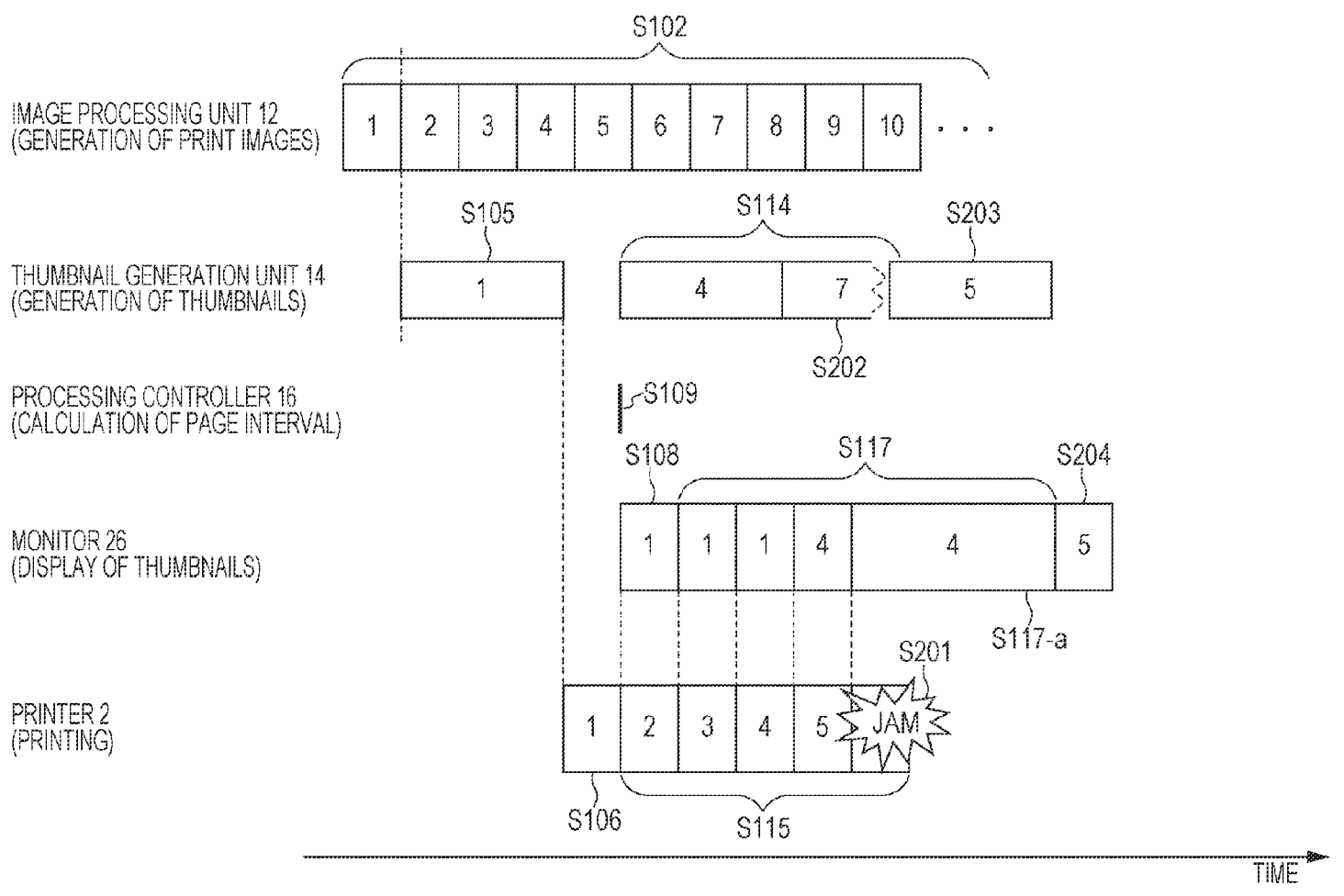

The foregoing description has been given while assuming that no error occurs in the course of print processing. Here, processing to be performed when an error occurs during printing will be described. FIG. 6 is a diagram based on FIG. 4. Processing to be performed when an error occurs during printing will be described with reference to FIG. 6.

It is assumed that an error occurs during printing of the sixth page as illustrated in FIG. 6 (step S201). When the print controller 13 receives a notification of an error from the printer 2 and detects the occurrence of an error during printing of the sixth page, the print controller 13 sends a notification of the error to the processing controller 16. When the processing controller 16 becomes aware of the print error, the processing controller 16 makes the thumbnail generation unit 14 stop generation of a thumbnail of the seventh page which is being performed (step S202), and makes the thumbnail generation unit 14 generate a thumbnail of a print image of a page that has been successfully printed immediately before the error detection. In the case of this example, an error is detected during printing of the sixth page and therefore a thumbnail of the fifth page is to be generated (step S203).

When the thumbnail generation unit 14 has generated a thumbnail of the fifth page in accordance with the instruction given by the processing controller 16, the display controller 15 displays on the monitor 26 the thumbnail of the fifth page in accordance with an instruction given by the processing controller 16 (step S204). Note that the thumbnail of the fourth page remains displayed until the thumbnail of the fifth page is displayed (step S117-*a*).

As described above, in this exemplary embodiment, when an error is detected, information regarding up to what page printing has been successfully completed is communicated to a user by generating and displaying a thumbnail of the last page that has been successfully printed. Note that, in FIG. 6, when an error occurs during printing of the fifth page, the thumbnail of the fourth page that has been successfully printed last has already been generated and therefore it is sufficient to only stop the ongoing generation of a thumbnail of the seventh page.

Note that, in this exemplary embodiment, the time required for printing and the time required for display are obtained on the basis of the first one page when calculating the page interval. However, the time required for printing and the time required for display may be obtained by calculating the average of each of the times on the basis of the first several pages. Alternatively, a certain set value obtained on the basis of the actual results or the like may be used instead of actually performing measurement.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a print controller that performs print control so as to make a print unit perform printing of print images for a plurality of pages generated from print data;
   a calculation unit that calculates, in a case where a time required for display is longer than a time required for printing, the time required for printing being a time required for a print image for one page generated from the print data to be printed by the print unit, the time required for display being a time required for a reduced image of the print image for the one page to be generated and displayed, a page interval at which display of a reduced image in synchronization with completion of printing of a print image is possible;
   a generation unit that generates reduced images of print images for pages among the plurality of pages at the page interval calculated by the calculation unit; and
   a display controller that performs display control so as to make a display perform display of a reduced image of a print image in synchronization with completion of printing of the print image, wherein
   the display controller makes, in a case where a reduced image of a print image to be displayed in synchronization with completion of printing of the print image has not been generated by the generation unit, a reduced image generated last be displayed in synchronization with completion of printing of the print image.

2. The image processing apparatus according to claim 1, further comprising:
   a detection unit that detects an error in printing, wherein
   the display controller makes a reduced image be displayed, the reduced image being a reduced image of a print image of a page that has been successfully printed immediately before detection of an error by the detection unit.

3. The image processing apparatus according to claim 2, wherein
   the generation unit generates, in a case where a reduced image of a print image of the page that has been successfully printed has not been generated, a reduced image of the print image, and
   the display controller makes the reduced image of the print image of the page that has been successfully printed be displayed, the reduced image having been generated by the generation unit.

4. An image processing method comprising:
   performing print control so as to make print images for a plurality of pages generated from print data be printed;
   calculating, in a case where a time required for display is longer than a time required for printing, the time required for printing being a time required for a print image for one page generated from the print data to be printed by the print unit, the time required for display being a time required for a reduced image of the print image for the one page to be generated and displayed, a page interval at which display of a reduced image in synchronization with completion of printing of a print image is possible;
   generating reduced images of print images for pages among the plurality of pages at the page interval that has been calculated; and
   performing display control so as to make a reduced image of a print image be displayed in synchronization with completion of printing of the print image, wherein
   the performing of display control includes, in a case where a reduced image of a print image to be displayed in synchronization with completion of printing of the print image has not been generated, making a reduced image generated last be displayed in synchronization with completion of printing of the print image.

5. A non-transitory computer readable medium storing a program causing a computer to execute a process for image processing, the process comprising:

performing print control so as to make print images for a plurality of pages generated from print data be printed;

calculating, in a case where a time required for display is longer than a time required for printing, the time required for printing being a time required for a print image for one page generated from the print data to be printed by the print unit, the time required for display being a time required for a reduced image of the print image for the one page to be generated and displayed, a page interval at which display of a reduced image in synchronization with completion of printing of a print image is possible;

generating reduced images of print images for pages among the plurality of pages at the page interval that has been calculated; and performing display control so as to make a reduced image of a print image be displayed in synchronization with completion of printing of the print image, wherein the performing of display control includes, in a case where a reduced image of a print image to be displayed in synchronization with completion of printing of the print image has not been generated, making a reduced image generated last be displayed in synchronization with completion of printing of the print image.

* * * * *